(12) United States Patent
Strelic et al.

(10) Patent No.: US 11,332,207 B2
(45) Date of Patent: May 17, 2022

(54) BOOSTER STEERING LOCK AND LOAD RELIEF CONTROL SYSTEM

(71) Applicant: Brandt Industries Inc., Regina (CA)

(72) Inventors: Raymond Strelic, Regina (CA); Brett Burke, Edmonton (CA); Anneke Snow, Regina (CA)

(73) Assignee: Brandt Industries Inc., Regina (CA)

( * ) Notice: Subject to any disclaimer, the term of this patent is extended or adjusted under 35 U.S.C. 154(b) by 16 days.

(21) Appl. No.: 16/836,160

(22) Filed: Mar. 31, 2020

(65) Prior Publication Data
US 2021/0300489 A1    Sep. 30, 2021

(51) Int. Cl.
*B62D 61/12*    (2006.01)
*B60G 11/28*    (2006.01)
*B62D 13/00*    (2006.01)

(52) U.S. Cl.
CPC .......... *B62D 61/125* (2013.01); *B60G 11/28* (2013.01); *B62D 13/00* (2013.01)

(58) Field of Classification Search
CPC ....... B62D 13/00; B62D 61/125; B60G 11/28
See application file for complete search history.

(56) References Cited

U.S. PATENT DOCUMENTS

| 5,549,322 A * | 8/1996 | Hauri | B60G 11/27 |
| | | | 180/209 |
| 5,620,194 A * | 4/1997 | Keeler | B62D 61/12 |
| | | | 280/81.6 |
| 6,050,578 A * | 4/2000 | Beck | B62D 53/067 |
| | | | 280/404 |
| 6,152,475 A * | 11/2000 | Poole | B62D 13/00 |
| | | | 280/426 |

(Continued)

FOREIGN PATENT DOCUMENTS

| CA | 2304897 C * | 5/2007 | .......... B62D 61/125 |
| CA | 2756470 C | 9/2015 | |

(Continued)

OTHER PUBLICATIONS

"Vehicle Weights and Dimensions—For Safe, Productive and Infrastructure-Friendly Vehicles," Ontario, Canada regulations 413/05, dated Sep. 29, 2017.

*Primary Examiner* — Jonathan Ng
*Assistant Examiner* — Mary E Young
(74) *Attorney, Agent, or Firm* — Frost Brown Todd LLC; Nicole M. Tepe

(57) ABSTRACT

A booster for a trailer system is provided comprising a control system in communication with a sensor(s) for determining the direction and speed of the booster when in motion. The control system comprises instructions corresponding to one or more booster operations such as: detection of a reverse state, retraction of a suspension system when the reverse state is detected; engagement of a steer axle lock when the reverse state is detected; detection of a forward state; extension of the suspension system when the forward state is detected; disengagement of the steer axle lock when the forward state is detected; detection of a high-speed forward state; engagement of the steer axle lock when the high-speed forward state is detected; detection of a low-speed forward state; and disengagement of the steer axle lock when the low-speed forward state is detected.

40 Claims, 6 Drawing Sheets

(56) References Cited

U.S. PATENT DOCUMENTS

| | | | | |
|---|---|---|---|---|
| 8,935,054 B2* | 1/2015 | Mantini | ................ | B60G 17/04 |
| | | | | 701/48 |
| 9,738,338 B2* | 8/2017 | Strong | ................ | B60G 17/005 |
| 11,220,304 B1* | 1/2022 | Bailey | ................ | B60G 11/27 |
| 11,241,923 B2* | 2/2022 | Johnston | ................ | B62D 61/10 |
| 2014/0210174 A1* | 7/2014 | Conaway | ................ | B62D 13/06 |
| | | | | 280/86.5 |
| 2014/0232080 A1* | 8/2014 | Karel | ................ | B60G 11/27 |
| | | | | 280/86.5 |
| 2019/0359272 A1* | 11/2019 | Stress | ................ | B62D 53/04 |
| 2021/0284260 A1* | 9/2021 | Isono | ................ | B60G 5/01 |

FOREIGN PATENT DOCUMENTS

| | | | | |
|---|---|---|---|---|
| DE | 202007018853 U1 * | 7/2009 | ......... | B62D 53/0864 |
| EP | 2634018 A1 * | 9/2013 | ............ | B60D 1/665 |

* cited by examiner

BOOSTER STEERING LOCK AND LOAD RELIEF CONTROL SYSTEM

FIELD

The field relates to heavy haul trailers and in particular to a booster for a heavy haul trailer.

BACKGROUND

Canadian Pat. No. 2,756,470 to Wheel Monitor Inc., herein incorporated by reference in its entirety, discloses a monitoring system to control liftable or steer axles on a truck or tractor-trailer by monitoring one or more input data types selected from the group consisting of speed and direction data, load data, turn signal data, engine data, and emergency signal data. Monitoring of the input data is achieved by sensors positioned on a fixed axle of the truck or tractor-trailer.

After processing the input data, a control module controls a lift axle electrical valving to lift one or more liftable axles, and also locks the self-steer axle in a straight position at a predetermined forward speed or adjusts a pressure on the air suspension of a steer axle to equalize an axle bearing weight.

SUMMARY

All of these aspects herein may be used in any and/or all combinations.

In a first aspect, a first booster for a trailer system is provided. The first booster comprises a frame; at least one self-steer axle coupled to the frame having at least one pair of wheels thereon; a coupler securing the frame to a rear end of the trailer system; a first sensor, directly or indirectly coupled to a first wheel of the at least one pair of wheels, for measuring direction of rotation information of the first wheel allowing for direction of the first booster to be determined when in motion; a steer axle lock that when engaged prevents the at least one self-steer axle from self-steering and when not engaged permits the at least one self-steer axle to self-steer; a suspension system extending between the frame and the at least one self-steer axle; and a control system in communication with the sensor. The control system comprises instructions to: detect a reverse state, when the booster is travelling in a reverse direction, based on the direction of rotation information provided by the first sensor; retract the suspension system when the reverse state is detected; and engage the steer axle lock when the reverse state is detected.

In a second aspect, a second booster for a trailer system is provided. The second booster comprises a frame; at least one self-steer axle coupled to the frame having at least one pair of wheels thereon; a coupler securing the frame to a rear end of the trailer system; a first sensor, directly or indirectly coupled to a first wheel of the at least one pair of wheels, for measuring direction of rotation information of the first wheel allowing for direction of the second booster to be determined when in motion; a steer axle lock that when engaged prevents the at least one self-steer axle from self-steering and when not engaged permits the at least one self-steer axle to self-steer; a suspension system extending between the frame and the at least one self-steer axle; and a control system in communication with the sensor. The control system comprises instructions to: detect a forward state, when the booster is travelling in a forward direction, based on the direction of rotation information provided by the first sensor; disengage the steer axle lock when the forward state is detected; and extend the suspension system when the reverse state is detected.

In a third aspect, a method for permitting and preventing at least one self-steer axle coupled to a frame of a booster from self-steering is provided. The method comprises the steps of: measuring direction of rotation information of a first wheel of at least one pair of wheels that are coupled to the at least one self-steer axle thereby allowing direction of the booster to be determined when in motion; detecting a reverse state, when the booster is travelling in a reverse direction, based on the direction of rotation information measuring; retracting a suspension system extending between the frame and the at least one self-steer axle when the reverse state is detected; and engaging the steer axle lock when the reverse state is detected thereby preventing the at least one self-steer axle from self-steering.

In a fourth aspect, a method for permitting and preventing at least one self-steer axle coupled to a frame of a booster from self-steering is provided. The method comprises the steps of: measuring direction of rotation information of a first wheel of at least one pair of wheels that are coupled to the at least one self-steer axle thereby allowing direction of the booster to be determined when in motion; detecting a forward state, when the booster is travelling in a forward direction, based on the direction of rotation information measuring; extending a suspension system extending between the frame and the at least one self-steer axle when the forward state is detected; and disengaging the steer axle lock when the reverse state is detected thereby preventing the at least one self-steer axle from self-steering.

DESCRIPTION OF THE DRAWINGS

While the invention is claimed in the concluding portions hereof, example embodiments are provided in the accompanying detailed description which may be best understood in conjunction with the accompanying diagrams where like parts in each of the several diagrams are labeled with like numbers, and where:

DETAILED DESCRIPTION

As shown in FIGS. 1A to 1D, a heavy haul trailer system 100 may comprise a number of axle units, such as a self-steer axle 102, 108 and/or a tandem axle 104, 106, 110. The trailer system 100 may be hauled using a tractor 600. A number of combinations may be possible.

Figure 1A:
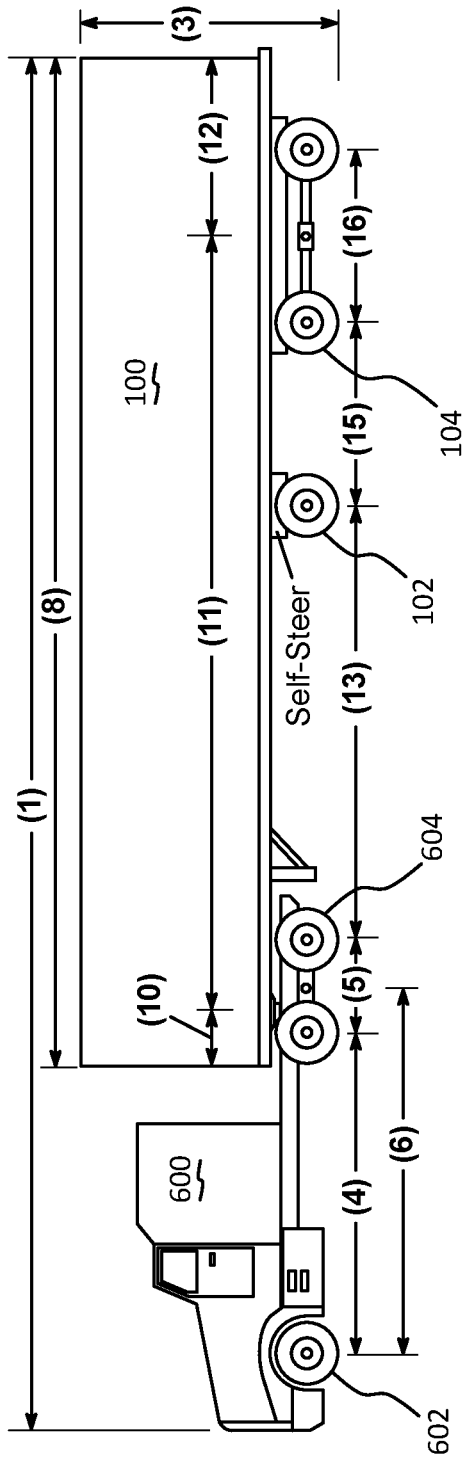
FIGS. 1A to 1D are side views of heavy haul multi-axle trailers of various configurations.

The combination of FIG. 1A demonstrates a front axle 602 of the tractor 600 being a single axle with single tires. A drive axle 604 of the tractor is a tandem axle. The semi-trailer 100 has two axle units: a single self-steer axle 102 in front and a tandem axle 104 in the rear.

Figure 1B:
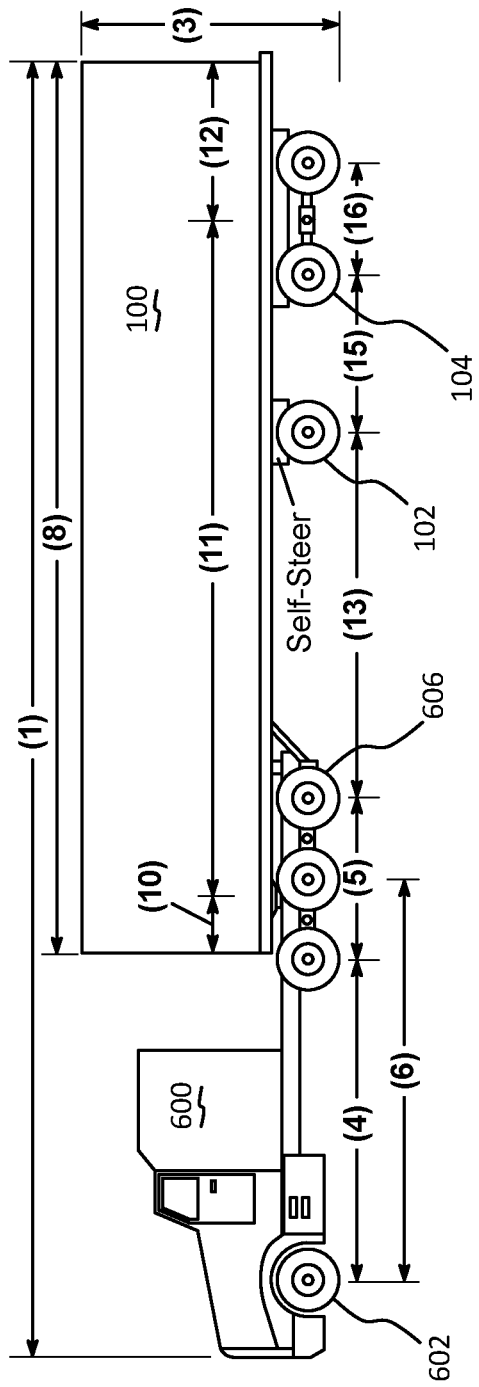

The combination of FIG. 1B demonstrates the front axle 602 of the tractor 600 also being a single axle with single tires. However, the drive axle 606 of the tractor is a tri-drive. The semi-trailer 100 has two axle units: the single self-steer axle 102 in front and the tandem axle 104 in the rear. A weight of the front axle 602 is at least 27 percent of the tri-drive.

Figure 1C:
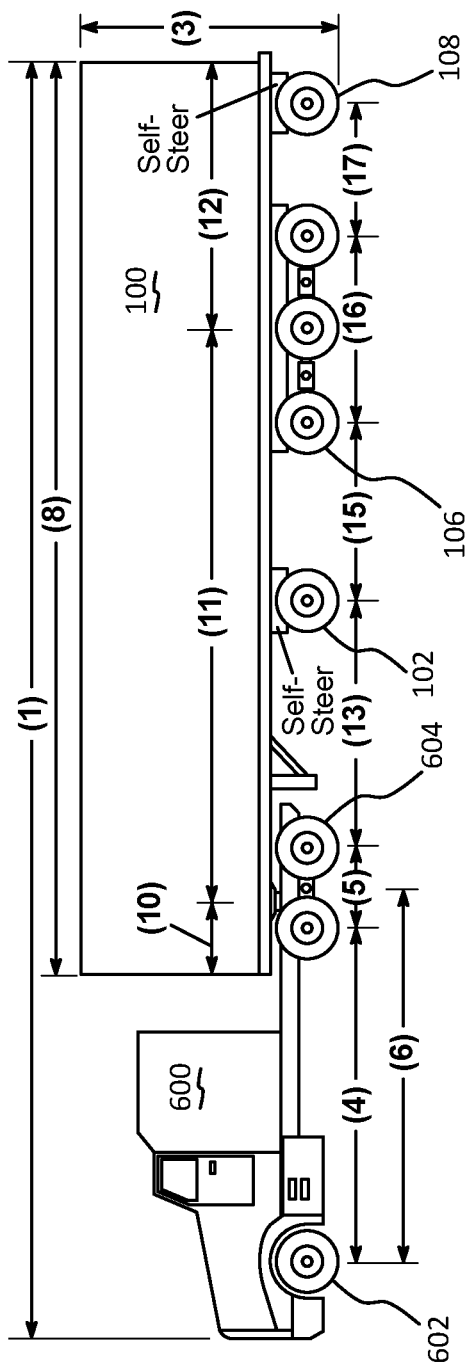

The combination of FIG. 1C demonstrates the front axle 602 of the tractor 600 also being a single axle with single tires. Similar to FIG. 1A, the drive axle 604 of the tractor is a tandem axle. The semi-trailer 100 has three axle units: a single self-steer axle 102 in front, a tridem axle 106 in the middle, and a rear self-steer axle 108 in the rear.

Figure 1D:
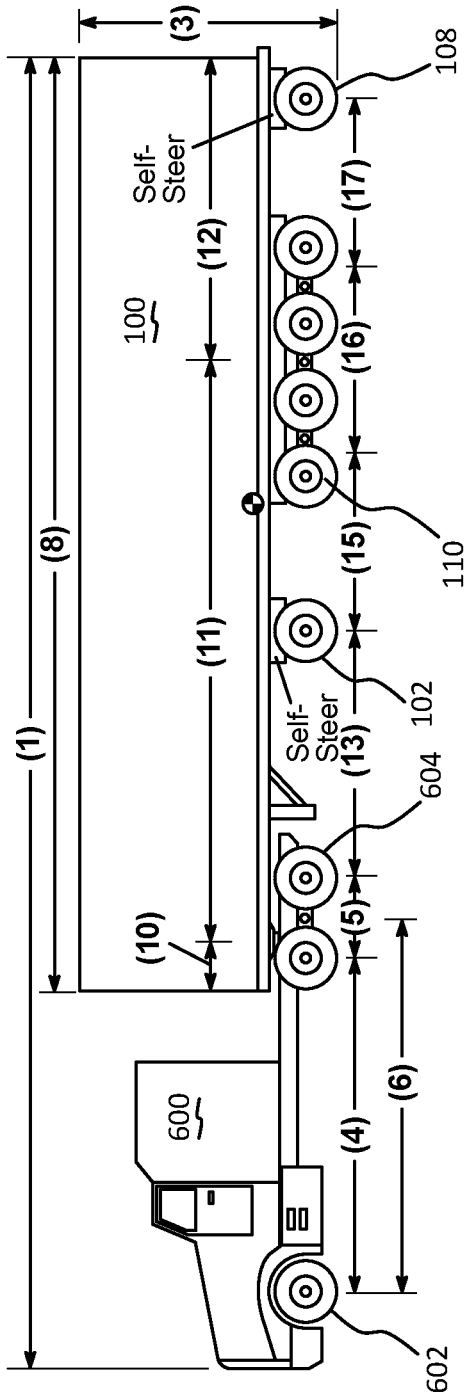

The combination of FIG. 1D demonstrates the front axle 602 of the tractor 600 also being a single axle with single tires. Similar to FIGS. 1A and 1C, the drive axle 604 of the tractor is a tandem axle. The semi-trailer 100 has two axle units and one axle group: a single self-steer axle 102 in front, a quadruple axle 110 in the middle and a single self-steer axle 108 in the rear.

Figure 2:
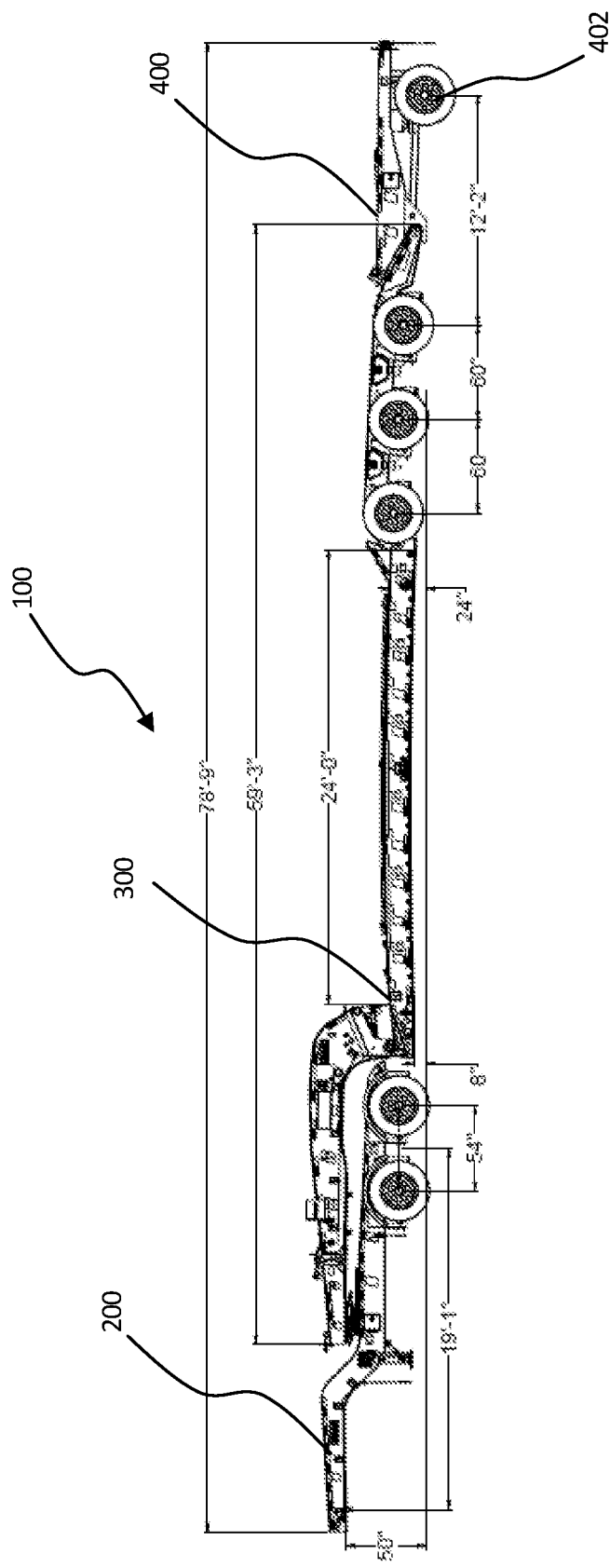
FIG. 2 is a side view of a trailer system with a booster.

In order for configurability and load management, the trailer system 100 may comprise a jeep 200, a trailer 300, and/or a booster 400 as shown in FIG. 2. The configuration may be determined in order to allow larger payloads to be carried by the trailer system 100, one or more load divider dollies, such as a jeep 200 and/or a booster 400 may be coupled to the trailer 300. The trailer 300 may be a removable gooseneck lowboy trailer but may comprise other types of trailers. When load divider dollies are rigidly attached to a towing vehicle 600 with no means of pivoting or turning, the dollies experience tire scrubbing and poor cornering.

In many instances, the booster 400 has a steering axle 402 to reduce the tire scrubbing and to improve cornering.

A typical trailer axle system typically consists of a beam with spindles on each end for the wheels. A self-steer axle introduces a pivot on vertical axis between the beam and the spindle to allow the spindle to move at an angle relative to the axis of the beam. It is apparent to those skilled in the art that the terms "self-steering axle", "steering axle" and "steer axle" refer to a "self-steer axle".

Although the booster 400 may have the steering axle 402, Safe-Productive-Infrastructure-Friendly (SPIF) vehicle testing in Ontario, Canada has revealed that the steering axle 102 behind a primary axle group 604, 606, such as those shown in FIGS. 1A to 1D, may induce an instability at high speeds with increased off-tracking. The instability may apply particularly to 5 to 6 axle semi-trailers. A solution to the instability has been to mandate in Ontario by regulations 413/05 "Vehicle Weights and Dimensions—For Safe, Productive and Infrastructure-Friendly Vehicles", dated Sep. 29, 2017, herein explicitly incorporated by reference in its entirety, that a lock for the self-steer axles 102, 108 of the trailer 100 engage automatically at 60-kilometers per hour (km/h) for four designated tractor-trailer combinations as shown in FIGS. 1A to 1D. Each of the combinations demonstrate a tractor 600 and a single semi-trailer system 100.

Specifically, the Ontario regulations specify that for FIGS. 1A and 1B, if an axle spread of the tandem axle 104 of the semi-trailer 100 exceeds 1.85-m, the tractor 600 and trailer system 100 combination must be equipped with an automatic device (not shown) that locks the self-steer axle 102 in the straight ahead position when the combination is travelling at a speed over 60-km/h. Similarly, the tractor 600 and trailer system 100 combination shown in FIGS. 1C and 1D must be equipped with the automatic device that locks a rearmost self-steer axle 108 in the straight-ahead position when the combination is travelling at a speed over 60-km/h.

Similarly, to the described-above problems associated with the trailer systems shown in FIGS. 1A to 1D, current heavy haul boosters, such as the booster 400 shown in FIG. 2, suffer from their rigid attachment to trailer and a high-speed instability, known in the industry as "booster dance". This instability may become severe enough to cause the booster to detach from the trailer at speed, potentially causing injury or death. By attempting to apply the regulations to the booster 400, complications may occur since the booster 400 is a separate vehicle that is rigidly attached to the semi-trailer 300.

Numerous systems to auto-lock a self-steer axle have been developed for many trailer systems 100, without a booster, in an effort to remedy the problems described above. Some of these systems are described in Canadian Pat. No. 2,756,470 to Wheel Monitor Inc. and the references discussed therein, which are herein incorporated by reference in their entirety. For example, in many trailer systems 100, without a booster 400, a velocity and a direction sensor installed on a non-steering (or non-lifting) fixed axle, are employed to determine whether a self-steer axle should be prevented or permitted to self-steer.

It has been found, however, that the prior art systems, suffer from their applicability to boosters such as the booster 400 shown in FIG. 2 as there are no fixed axles to attach a velocity and direction sensor onto. Typically, the prior art employs sensors on fixed axles as lift-axles are lifted (to alleviate a load on the axle) when a trailer system is reversing thereby rendering the lift-axles and wheels coupled thereon inappropriate to couple sensors onto as such sensors would not be able to detect forward motion. The closest fixed axle of a booster, such as the booster 400 shown in FIG. 2, is on an adjacent vehicle thereby rendering it impractical to use. Locking and unlocking of a self-steer axle on a booster therefore typically proceeds via a manual operation where a user manually operate a switch to engage or disengage a lock pin to respectively lock or unlock a self-steer axle.

What is needed, therefore, is a system that is relatively simple and robust in construction and considers boosters with only one or more self-steer axles and no fixed axles to attach velocity and direction sensor onto.

The present invention contemplates that since the booster 400 shown in FIG. 2 comprises only one or more self-steer axle(s) 402, a velocity sensor and direction sensor may be located on the self-steer axle 402 rather than a non-steering axle. Rather than lifting an axle off the ground to alleviate a load carried by the axle, some aspects of the present invention instead contemplate compressing a suspension system coupled to a self-steer axle allowing a wheel coupled to a self-steer axle to remain on the ground while reducing a load carried by the booster 400 when traveling in reverse. This may allow a sensor, coupled to the wheel, to still monitor speed and rotation direction of the wheel so that forward movement and speed can be detected and monitored after reverse motion is detected.

For example, when the booster 400 is traveling in reverse, the present invention may automatically lock or secure the steer axle 402. Preferably, the present invention also compresses a suspension system, if necessary, extending between a frame of the booster 400 and the self-steer axle 402 thereby reducing a load carried by the booster 400 when traveling in reverse.

When travelling forward, the present invention may automatically unlock the self-steer axle 402 allowing it to be steerable. Preferably, the present invention also expands a suspension system, if necessary, extending between a frame of the booster 400 and the self-steer axle 402 thereby increasing a load on the booster 400 when traveling forward.

When travelling forward, the present invention may also automatically lock the self-steer axle 402 when the booster 400 reaches a predetermined speed (for example, 60 km/hr) when travelling forward and automatically unlock the self-steer axle 402 when the booster 400 is below the predetermined speed.

Figure 3A:
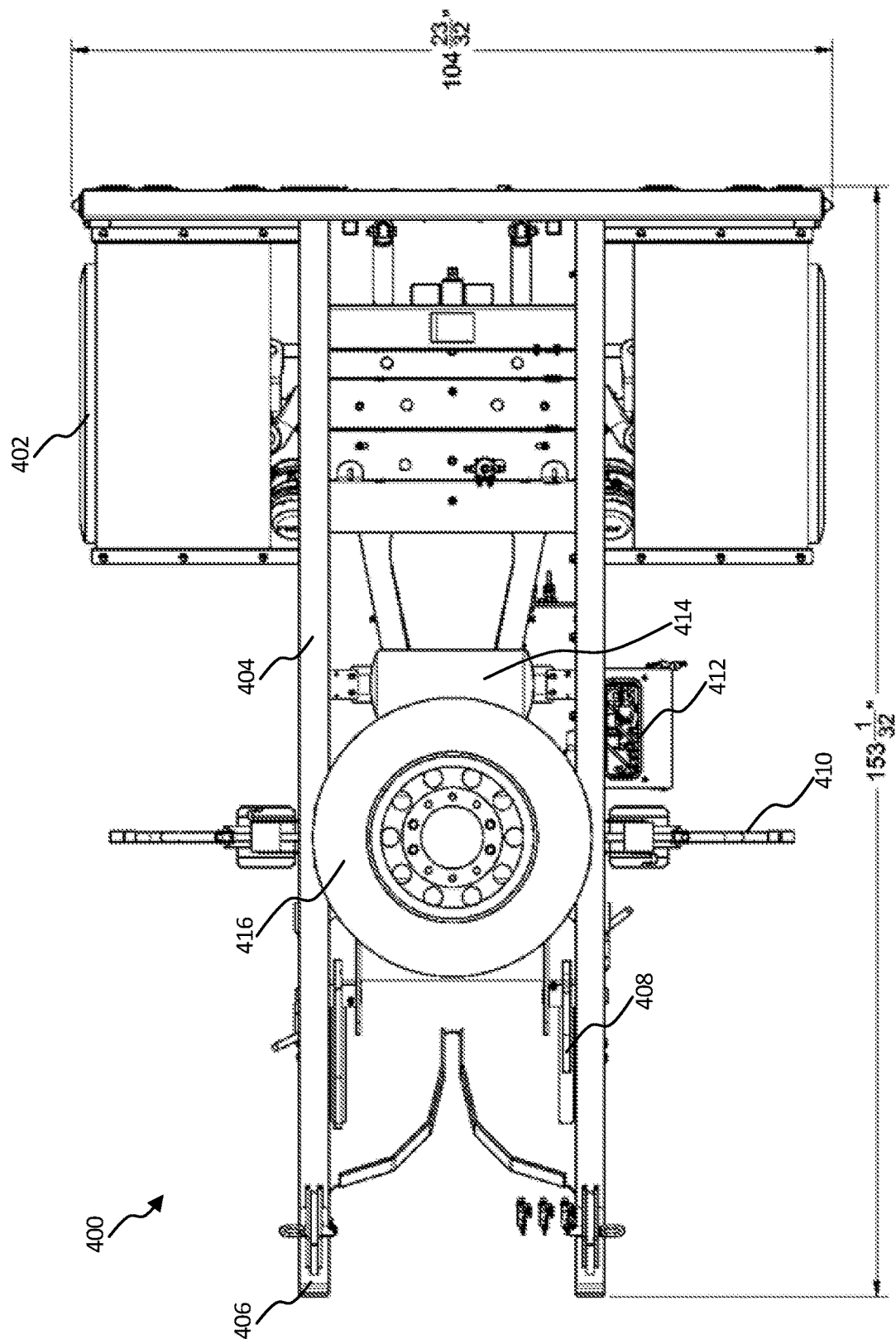
FIGS. 3A to 3C are respectively a top view, a side view, and a rear view of the booster.
Figure 3B:
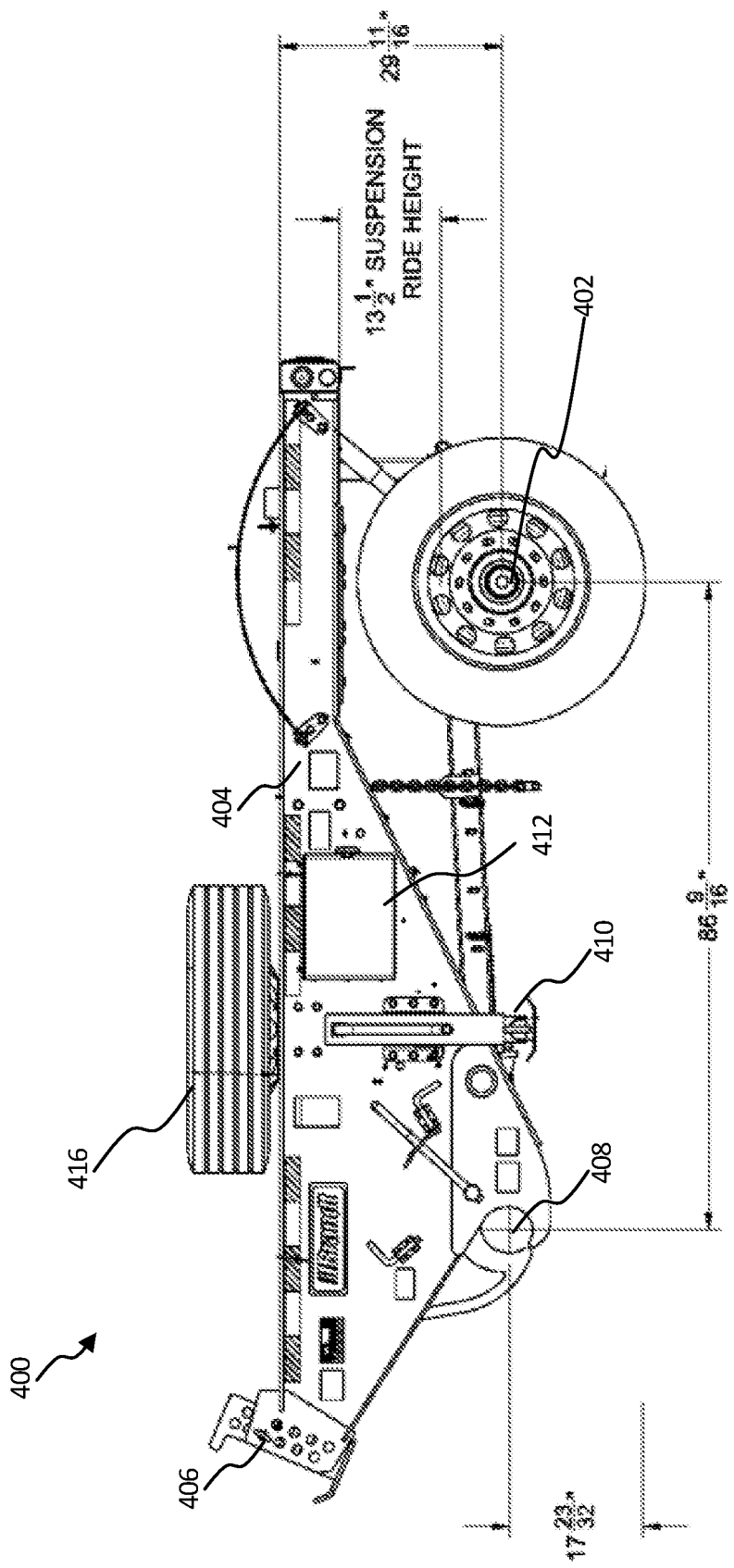
Figure 3C:
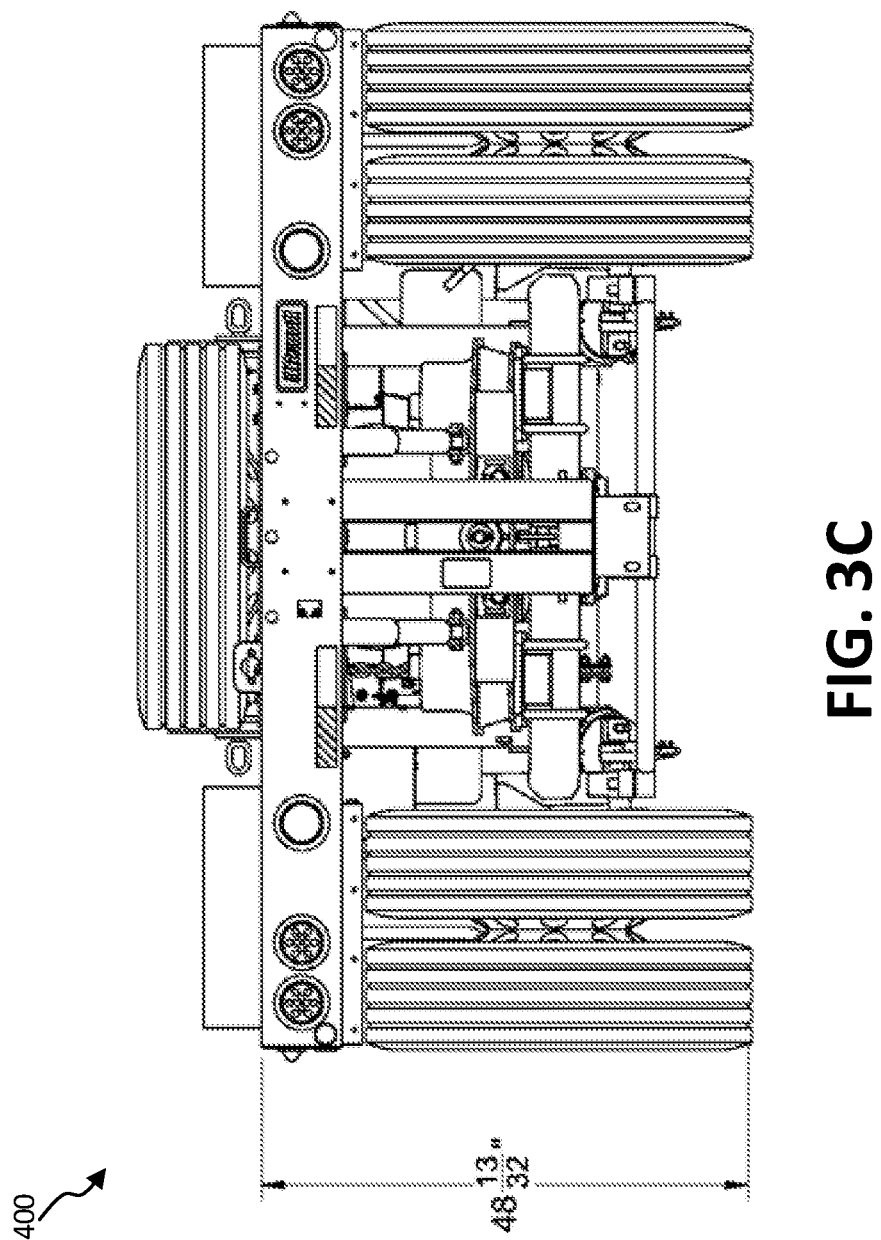

An example of the booster 400 with a single self-steer axle 402 may be shown in FIGS. 3A to 3C. The booster 400, also known as a "fishmouth booster", comprises a self-steer axle 402 coupled to a frame 404. The frame 404 may be generally rectangular in shape and/or may comprise one or more platforms. The axle 402 may comprise one or more pairs of wheels and their associated tires. At one end of the frame 404 may be one or more couplers 406, 408 configured to couple to a rear end of the trailer 300. A pair of jack legs 410 coupled to the frame 404 may be used to retain the booster 400 in a level position when the booster 400 is decoupled from the trailer 300. A pneumatic suspension system may be provided by a controller 412 coupled to an air tank 414. In one aspect, the pneumatic suspension system may have one or more air bags. The description herein is merely an example and those skilled in the art upon reviewing the description maybe aware of numerous suspension system arrangements and means suitable for implementation. A spare tire assembly 416 may also be coupled to a top surface of the frame 404.

At least one sensor is provided (not shown to avoid obscuring other components) for measuring direction of rotation information and/or speed of rotation information of a wheel coupled to the axle 402. For example, a Hall-Effect sensor may be employed wherein the sensor, provided on a block attached to the axle, faces an exciter ring mounted on the wheel hub. When the hub rotates, the teeth of the exciter ring pass across the face of the sensor thereby allowing the sensor to determine speed and direction of rotation of the wheel. Numerous sensors for measuring direction of rotation information and/or speed of rotation information of a wheel that could be employed within the scope of the description herein would be known to those skilled in the art. For example, several sensors are described in Canadian Pat. No. 2,756,470 to Wheel Monitor Inc. and the references mentioned therein, which are herein incorporated by reference in their entirety. In some aspects, there may be more than one sensor employed for measuring direction of rotation information and/or speed of rotation information of one or more wheels coupled to the axle 402.

A steer axle lock is provided that when engaged prevents the self-steer axle 402 from self-steering and when not engaged permits the self-steer axle 402 to self-steer. Numerous steer-axle lock assemblies for preventing and permitting a self-steer axle 402 to self-steer that could be employed within the scope of the description herein would be known to those skilled in the art. For example, spindle ends of a steering axle are typically joined by a tie rod to ensure they rotate together. To lock a steer axle, a latch that is moved by an air actuator is moved into position to engage with the center of the tie rod, thereby preventing movement.

In one aspect, a steer axle lock includes a small air pot is provided that will pivot a lock down component onto a locking plate when the wheels are centered. Such a steer axle lock assembly would be known to those skilled in the art. For example, Dexter manufactures such assemblies—such as the Ingersoll Axle.

The information measured by the sensor is provided to a controller 412 located on the booster 400 which may lock the steering axle 402 of the booster 400 at highway speeds in order to improve the high-speed performance of the booster 400 or when the booster 400 is traveling in reverse.

In some aspects, upon receiving information from the sensor, the controller 412 may detect a reverse state, when the booster is travelling in a reverse direction, based on the direction of rotation information provided by the sensor. Upon detection of a reverse state, the controller 412 may generate instructions to deflate the pneumatic suspension system and engage the steer axle lock thereby locking the self-steer axle 402 as the booster travels in reverse. Deflating the pneumatic suspension system may decrease the distance between the self-steer 402 axle and the frame 404 thereby reducing a load carried by the booster 400.

In one aspect, the steer axle lock, when engaged, prevents the self-steer axle 402 from self-steering only when the wheels are positioned to allow movement of the booster 400 in a direction that is parallel to the longitudinal axis of the booster 400. In other words, the wheels are locked when in a straight configuration as the booster 400 travels in reverse.

In some aspects, upon receiving information from the sensor, the controller 412 may detect a forward state, when the booster is travelling in a forward direction, based on the direction of rotation information provided by the sensor. Upon detection of a forward state, the controller 412 may generate instructions to disengage the steer axle lock; and inflate the pneumatic suspension system when the forward state is detected. Inflating the pneumatic suspension system may increase the distance between the self-steer 402 axle and the frame 404 thereby increasing a load carried by the booster 400.

It should be noted that to detect a reverse state, a typical automatic control system found on trailers 300 may engage a lock pin. However, such typical automatic control systems detect forward movement using a fixed axle to exit a reverse state. This detection is not possible with the booster 400 because the nearest fixed axle is located on the adjacent trailer 300 making the fixed axle impractical to use. As previously discussed, some solutions require an operator to manually engage and disengage a lock pin for locking and unlocking a self-steer axle 402.

The present system as described herein detects forward motion by deflating the pneumatic suspension system and foregoing the lifting the axle(s) 402 off the ground. The deflation of the pneumatic suspension system may relieve the axle(s) 402 of all weight except for the unsprung mass thereby allowing ease of reverse operation. As the wheels remain in contact with the ground, forward motion may be detected by the sensor by a forward rotation of the wheels thereby triggering the unlocking of the self-steer axle 402 and the re-inflating of the suspension.

In some aspects, upon receiving information from the sensor, the controller 412 may detect a high-speed forward state, when the booster is travelling in forward direction at a speed that is equal to or greater than a predetermined speed, based on the speed of rotation information and the direction of rotation information provided by sensor. Upon detection of a high-speed forward state, the controller 412 may generate instructions to engage the steer axle lock thereby preventing the self-steer axle 402 from self-steering. This may occur in situations such as when the booster 400 is traveling at a high speed on a highway (for example at 60 km/hr and above). In one aspect, the steer axle lock, when engaged, prevents the self-steer axle 402 from self-steering only when the wheels are positioned to allow movement of the booster 400 in a direction that is parallel to the longitudinal axis of the booster 400.

In some aspects, upon receiving information from the sensor, the controller 412 may detect a low-speed forward state, when the booster is travelling in forward direction at a speed that is less than a predetermined speed, based on the speed of rotation information and the direction of rotation information provided by sensor. Upon detection of a low-speed forward state, the controller 412 may generate instructions to disengage the steer axle lock thereby allowing the self-steer axle 402 to self-steer. This may occur in situations such as when the booster 400 is traveling at a low speed (for example at speeds lower than 60 km/hr).

Components, such as, but not limited to valves and switches, may be adjusted so that instructions generated by the controller are carried out. Many different types of means and arrangements suitable for carrying out the foregoing instructions of the controller 412 are possible within the scope of the present invention and would be known to those skilled in the art. For example, in some aspects of the present invention, the controller 412 receives speed and direction inputs from the sensor, processes the information and sends the applicable signals to one or more solenoid valves. The solenoid valves will upon activation deliver pneumatic pressure to the steer lock actuator and/or the suspension air bags. Upon removal of the processor signal, the solenoid valve will revert to a preferred state and exhaust the air supplied to the suspension or steer lock.

In operation, the controller 412 ether detects a reverse state, a forward state, a high-speed forward state or a low-speed forward state.

If a reverse state is detected, the controller 412 generates instructions that ensure the steer axle lock is engaged to prevent the self-steer axle 402 from self-steering, and that the suspension system is deflated (or compressed) to a predetermined pressure (or height) such that the load carried by the booster is decreased. A reverse state may be detected following the detection of forward state or a state where the booster 400 is stationary.

If a forward state is detected, the controller 412 generates instructions that ensure the steer axle lock is disengaged to allow the self-steer axle 402 to self-steer, and that the suspension system is inflated (or extended) to a predetermined pressure (or length) such that the load carried by the booster is increased. A forward state may be detected following the detection of reverse state or a state where the booster 400 is stationary.

If a high-speed forward state is detected, the controller 412 generates instructions that ensure the steer axle lock is engaged to prevent the self-steer axle 402 from self-steering. A high-speed forward state may be detected following the detection of low-speed forward state.

If a low-speed forward state is detected, the controller 412 generates instructions that ensure the steer axle lock is disengaged to allow the self-steer axle 402 to self-steer. A low-speed forward state may be detected following the detection of high-speed forward state.

The foregoing is considered as illustrative only of the principles of the invention. Further, since numerous changes and modifications will readily occur to those skilled in the art upon review of the present description and drawings, the foregoing is not desired to limit the invention to the exact construction and operation shown and described, and accordingly, all such suitable changes or modifications in structure or operation which may be resorted to are intended to fall within the scope of the claimed invention.

What is claimed is:

1. A booster for a trailer system, the booster comprising:
   a frame;
   at least one self-steer axle coupled to the frame having at least one pair of wheels thereon;
   a coupler provided at an end of the frame for securing the frame to a rear end of the trailer system;
   a first sensor, directly or indirectly coupled to a first wheel of the at least one pair of wheels, for measuring direction of rotation information of the first wheel allowing for direction of the booster to be determined when in motion;
   a steer axle lock that when engaged prevents the at least one self-steer axle from self-steering and when not engaged permits the at least one self-steer axle to self-steer;
   a suspension system extending between the frame and the at least one self-steer axle; and
   a control system in communication with the first sensor, the control system comprising instructions to:
      detect a reverse state, when the booster is travelling in a reverse direction, based on the direction of rotation information provided by the first sensor;
      retract the suspension system when the reverse state is detected; and
      engage the steer axle lock when the reverse state is detected.

2. The booster of claim 1, wherein:
   the suspension system is a pneumatic suspension system providing suspension via at least one air bag; and
   the control system further comprises instructions to:
      deflate the at least one air bag when the reverse state is detected.

3. The booster of claim 1, wherein retracting the suspension system decreases the distance between the at least one self-steer axle and the frame thereby reducing a load carried by the booster.

4. The booster of claim 1, wherein the steer axle lock, when engaged, prevents the at least one self-steer axle from self-steering such that the at least one pair of wheels are positioned to allow movement of the booster in a direction that is parallel to the longitudinal axis of the booster.

5. The booster of claim 1, wherein the control system further comprises instructions to:
   detect a forward state, when the booster is travelling in a forward direction, based on the direction of rotation information provided by the first sensor;
   disengage the steer axle lock when the forward state is detected; and
   extend the suspension system when the forward state is detected.

6. The booster of claim 5, wherein:
   the suspension system is a pneumatic suspension system providing suspension via at least one air bag; and
   the control system further comprises instructions to:
      inflate the at least one air bag when the forward state is detected.

7. The booster of claim 5, wherein extending the suspension system increases the distance between the at least one self-steer axle and the frame thereby increasing a load carried by the booster.

8. The booster of claim 5 further comprising a second sensor, directly or indirectly coupled to a second wheel of the at least one pair of wheels, for measuring speed of rotation information of the second wheel allowing for speed of the booster to be determined when in motion.

9. The booster of claim 8 wherein the first sensor and second sensor are the same, and wherein the first wheel and the second wheel are the same.

10. The booster of claim 8, wherein the control system is in communication with the second sensor and further comprises instructions to:
   detect a high-speed forward state, when the booster is travelling in forward direction at a speed that is equal to or greater than a predetermined speed, based on the speed of rotation information and the direction of rotation information provided by the second sensor and first sensor, respectively; and engage the steer axle lock when the high-speed forward state is detected.

11. The booster of claim 10, wherein the predetermined speed is 60 kilometers per hour.

12. The booster of claim 8, wherein the control system further comprises instructions to:
    detect a low-speed forward state, when the booster is travelling in forward direction at a speed that is less than a predetermined speed, based on the speed of rotation information and the direction of rotation information provided by the second sensor and first sensor, respectively; and
    disengage the steer axle lock when the low-speed forward state is detected.

13. The booster of claim 12, wherein, the control system causes one or more booster operations, that are based on the instructions, selected from the group of:
    detection of the reverse state,
    retraction of the suspension system when the reverse state is detected;
    engagement of the steer axle lock when the reverse state is detected;
    detection of the forward state;
    extension of the suspension system when the forward state is detected;
    disengagement of the steer axle lock when the forward state is detected;
    detection of the high-speed forward state;
    engagement of the steer axle lock when the high-speed forward state is detected;
    detection of the low-speed forward state; and
    disengagement of the steer axle lock when the low-speed forward state is detected.

14. A booster for a trailer system, the booster comprising:
    a frame;
    at least one self-steer axle coupled to the frame having at least one pair of wheels thereon;
    a coupler provided at an end of the frame for securing the frame to a rear end of the trailer system;
    a first sensor, directly or indirectly coupled to a first wheel of the at least one pair of wheels, for measuring direction of rotation information of the first wheel allowing for direction of the booster to be determined when in motion;
    a steer axle lock that when engaged prevents the at least one self-steer axle from self-steering and when not engaged permits the at least one self-steer axle to self-steer;
    a suspension system extending between the frame and the at least one self-steer axle; and
    a control system in communication with the sensor, the control system comprising instructions to:
        detect a forward state, when the booster is travelling in a forward direction, based on the direction of rotation information provided by the first sensor;
        disengage the steer axle lock when the forward state is detected; and
        extend the suspension system when the forward state is detected.

15. The booster of claim 14, wherein:
    the suspension system is a pneumatic suspension system providing suspension via at least one air bag; and
    the control system further comprises instructions to:
        deflate the at least one air bag when a reverse state is detected.

16. The booster of claim 14, wherein extending the suspension system increases the distance between the at least one self-steer axle and the frame thereby increasing a load carried by the booster.

17. The booster of claim 14 further comprising a second sensor, directly or indirectly coupled to a second wheel of the at least one pair of wheels, for measuring speed of rotation information of the second wheel allowing for speed of the booster to be determined when in motion.

18. The booster of claim 17 wherein the first sensor and second sensor are the same, and wherein the first wheel and the second wheel are the same.

19. The booster of claim 17, wherein the control system is in communication with the second sensor and further comprises instructions to:
    detect a high-speed forward state, when the booster is travelling in forward direction at a speed that is equal to or greater than a predetermined speed, based on the speed of rotation information and the direction of rotation information provided by the second sensor and first sensor, respectively; and
    engage the steer axle lock when the high-speed forward state is detected.

20. The booster of claim 17, wherein the control system further comprises instructions to:
    detect a low-speed forward state, when the booster is travelling in forward direction at a speed that is less than a predetermined speed, based on the speed of rotation information and the direction of rotation information provided by the second sensor and first sensor, respectively; and
    disengage the steer axle lock when the low-speed forward state is detected.

21. The booster of claim 19, wherein the predetermined speed is 60 kilometers per hour.

22. A method for permitting and preventing at least one self-steer axle coupled to a frame of a booster from self-steering, the method comprising the steps of:
    coupling the frame of the booster to a rear end of a trailer system;
    measuring direction of rotation information of a first wheel of at least one pair of wheels that are coupled to the at least one self-steer axle thereby allowing direction of the booster to be determined when in motion;
    detecting a reverse state, when the booster is travelling in a reverse direction, based on the direction of rotation information measuring;
    retracting a suspension system extending between the frame and the at least one self-steer axle when the reverse state is detected; and
    engaging a steer axle lock when the reverse state is detected thereby preventing the at least one self-steer axle from self-steering.

23. The method of claim 22, wherein retracting the suspension system decreases the distance between the at least one self-steer axle and the frame thereby reducing a load carried by the booster.

24. The method of claim 22, wherein:
    the suspension system is a pneumatic suspension system providing suspension via at least one air bag; and
    the method further comprises the step of:
        deflating the at least one air bag when the reverse state is detected.

25. The method of claim 22 further comprising the steps of:
- detecting a forward state, when the booster is travelling in a forward direction, based on the direction of rotation information measuring;
- disengaging the steer axle lock when the forward state is detected thereby permitting the at least one self-steer axle to self-steer; and
- extending the suspension system when the forward state is detected.

26. The method of claim 25, wherein extending the suspension system increases the distance between the at least one self-steer axle and the frame thereby increasing a load carried by the booster.

27. The booster of claim 25, wherein:
- the suspension system is a pneumatic suspension system providing suspension via at least one air bag; and
- the method further comprises the step of:
  - inflating the at least one air bag when the forward state is detected.

28. The method of claim 25 further comprising the step of: measuring speed of rotation information of a second wheel of the at least one pair of wheels that are coupled to the at least one self-steer axle thereby allowing for speed of the booster to be determined when in motion.

29. The method of claim 28 wherein the first wheel and the second wheel are the same.

30. The method of claim 28 further comprising the step of:
- detecting a high-speed forward state, when the booster is travelling in forward direction at a speed that is equal to or greater than a predetermined speed, based on the speed of rotation information and the direction of rotation information measured; and
- engaging the steer axle lock when the high-speed forward state is detected thereby preventing the at least one self-steer axle from self-steering.

31. The method of claim 28 further comprising the step of:
- detecting a low-speed forward state, when the booster is travelling in forward direction at a speed that is less than a predetermined speed, based on the speed of rotation information and the direction of rotation information measure; and
- disengaging the steer axle lock when a high-speed forward state is detected thereby permitting the at least one self-steer axle to self-steer.

32. The method of claim 30, wherein the predetermined speed is 60 kilometers per hour.

33. A method for permitting and preventing at least one self-steer axle coupled to a frame of a booster from self-steering, the method comprising the steps of:
- coupling the frame of the booster to a rear end of a trailer system;
- measuring direction of rotation information of a first wheel of at least one pair of wheels that are coupled to the at least one self-steer axle thereby allowing direction of the booster to be determined when in motion;
- detecting a forward state, when the booster is travelling in a forward direction, based on the direction of rotation information measuring;
- extending a suspension system extending between the frame and the at least one self-steer axle when the forward state is detected; and
- disengaging a steer axle lock when the forward state is detected thereby permitting the at least one self-steer axle to self-steering.

34. The method of claim 33, wherein extending the suspension system increases the distance between the at least one self-steer axle and the frame thereby increasing a load carried by the booster.

35. The booster of claim 33, wherein:
- the suspension system is a pneumatic suspension system providing suspension via at least one air bag; and
- the method further comprises the step of:
  - inflating the at least one air bag when the forward state is detected.

36. The method of claim 33 further comprising the step of: measuring speed of rotation information of a second wheel of the at least one pair of wheels that are coupled to the at least one self-steer axle thereby allowing for speed of the booster to be determined when in motion.

37. The method of claim 36 wherein the first wheel and the second wheel are the same.

38. The method of claim 36 further comprising the step of:
- detecting a high-speed forward state, when the booster is travelling in forward direction at a speed that is equal to or greater than a predetermined speed, based on the speed of rotation information and the direction of rotation information measured; and
- engaging the steer axle lock when the high-speed forward state is detected thereby preventing the at least one self-steer axle from self-steering.

39. The method of claim 36 further comprising the step of:
- detecting a low-speed forward state, when the booster is travelling in forward direction at a speed that is less than a predetermined speed, based on the speed of rotation information and the direction of rotation information measure; and
- disengaging the steer axle lock when a high-speed forward state is detected thereby permitting the at least one self-steer axle to self-steer.

40. The method of claim 38, wherein the predetermined speed is 60 kilometers per hour.

* * * * *